US008810966B1

(12) United States Patent
Zhong

(10) Patent No.: US 8,810,966 B1
(45) Date of Patent: Aug. 19, 2014

(54) REUSABLE ATTACHMENT PADS FOR SLIDER MOUNTING

(71) Applicant: Seagate Technology LLC, Cupertino, CA (US)

(72) Inventor: Lijuan Zhong, Eden Prairie, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 13/796,518

(22) Filed: Mar. 12, 2013

(51) Int. Cl.
G11B 5/48 (2006.01)
G11B 5/60 (2006.01)

(52) U.S. Cl.
USPC ............................. 360/234.6; 360/234.5

(58) Field of Classification Search
USPC ............................. 360/234.5, 234.6
See application file for complete search history.

(56) References Cited

U.S. PATENT DOCUMENTS

| | | | |
|---|---|---|---|
| 6,943,302 B2* | 9/2005 | Kageyama et al. ............ 174/254 |
| 6,989,326 B2 | 1/2006 | Tong et al. | |
| 7,274,538 B2 | 9/2007 | Thurn et al. | |
| 7,307,816 B1 | 12/2007 | Thornton et al. | |
| 7,400,473 B1 | 7/2008 | Krajnovich et al. | |
| 7,547,623 B2 | 6/2009 | Mis et al. | |
| 7,701,676 B2 | 4/2010 | Kubotera et al. | |
| 7,719,796 B2* | 5/2010 | Takahashi et al. ......... 360/244.8 |
| 7,808,741 B2 | 10/2010 | Matsumoto et al. | |
| 8,054,584 B2* | 11/2011 | Limmer et al. ............. 360/234.5 |
| 8,240,545 B1* | 8/2012 | Wang et al. ................ 228/123.1 |
| 2003/0174430 A1 | 9/2003 | Takahasi et al. | |
| 2005/0028353 A1* | 2/2005 | Kidachi et al. ............. 29/603.03 |
| 2007/0269973 A1* | 11/2007 | Nalla et al. .................... 438/612 |
| 2009/0011540 A1* | 1/2009 | Doan ........................... 438/109 |
| 2011/0157750 A1* | 6/2011 | Zhu et al. .................... 360/245.8 |
| 2012/0012642 A1* | 1/2012 | Fogel et al. ................. 228/56.3 |
| 2013/0277863 A1* | 10/2013 | Zhong et al. .................. 257/779 |

* cited by examiner

Primary Examiner — Jefferson Evans
(74) Attorney, Agent, or Firm — Braden Katterheinrich

(57) ABSTRACT

A slider for a disc drive assembly may be attached to various substrates during manufacture and installation in the disc drive assembly. In some examples, a slider attachment system includes a substrate, a first diffusion barrier layer formed over the substrate, a first solder-wettable protection layer formed over the first diffusion barrier layer, a second diffusion barrier layer formed over the first solder-wettable protection layer, and a second solder-wettable protection layer formed over the second diffusion barrier layer. The first and second solder-wettable protection layers may be formed of a material that is inert to a chemical etchant that can chemically dissolve the diffusion barrier layers. In use, solder may be applied to the second solder-wettable protection layer to wet and dissolve the layer. If the substrate needs to be detached and reattached, etchant can chemically dissolve the second diffusion barrier layer to expose the first solder-wettable layer for reattachment.

20 Claims, 7 Drawing Sheets

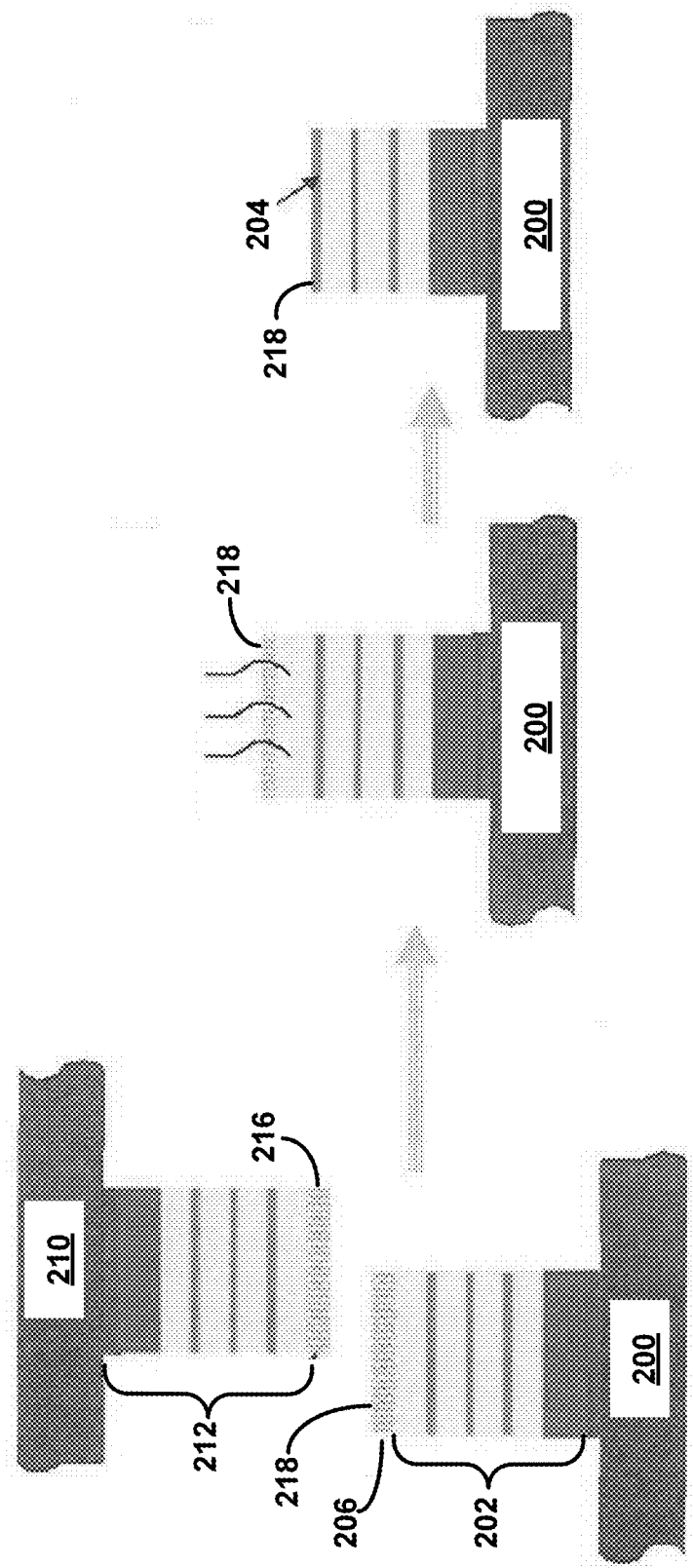

REUSABLE ATTACHMENT PADS FOR SLIDER MOUNTING

BACKGROUND

Magnetic data storage devices include magnetic read/write heads that detect and modify the magnetic properties of a magnetic storage medium. For example, a magnetic read/write head may include a reader portion for retrieving magnetically-encoded information from a magnetic storage medium and a writer portion for magnetically encoding the information on the magnetic storage medium. Typically, the magnetic read/write head is mounted on a slider that slides or "flies" over the surface of a magnetic disc on an air bearing created by rotation of the magnetic disc.

To manufacture a slider, a slider substrate can be mounted on a carrier that carries the slider through clean room manufacturing processing. During processing, different materials may be coated and removed from different areas of the slider substrate to define a patterned surface for reading information from and/or writing information to a magnetic storage medium. To attach the slider substrate to the carrier, a solder bond may be formed between an attachment pad on the slider substrate and an attachment pad on the carrier. Each attachment pad may include a solder-wettable material that wets upon contact with molten solder.

During the process of manufacturing large numbers of sliders, defects may be identified in a few individual sliders. To correct these defects, the individual slider substrates may be detached from the carrier that carries the sliders through processing in order to reprocess the sliders and to correct the defects. Thereafter, to attach the defective slider to a different carrier for reprocessing, another solder bond may be formed between the slider substrate and the different carrier. In instances in which the slider substrate does not have a supplemental attachment pad, however, a new attachment pad may need to be deposited on the slider before the slider can be bonded to the different carrier. The original solder bond between the slider substrate and the original carrier may consume all of the solder-wettable material on the slider substrate, preventing the formation of a secondary solder bond between the slider substrate and a carrier.

SUMMARY

In one aspect, the disclosure is directed to a slider attachment system that includes a substrate, a first diffusion barrier layer formed over at least a portion of the substrate, and a first solder-wettable protection layer formed over the first diffusion barrier layer. According to this aspect, the slider attachment system also includes a second diffusion barrier layer formed over the first solder-wettable protection layer, and a second solder-wettable protection layer formed over the second diffusion barrier layer.

The details of one or more examples are set forth in the accompanying drawings and the description below. Other features, objects, and advantages will be apparent from the description and drawings, and from the claims.

BRIEF DESCRIPTION OF DRAWINGS

FIGS. 6A-6F are conceptual illustrations of example processing steps that may be performed to attach a slider to an attachment surface and then restore an attachment pad to allow for a subsequent solder connection.

DETAILED DESCRIPTION

Figure 1:
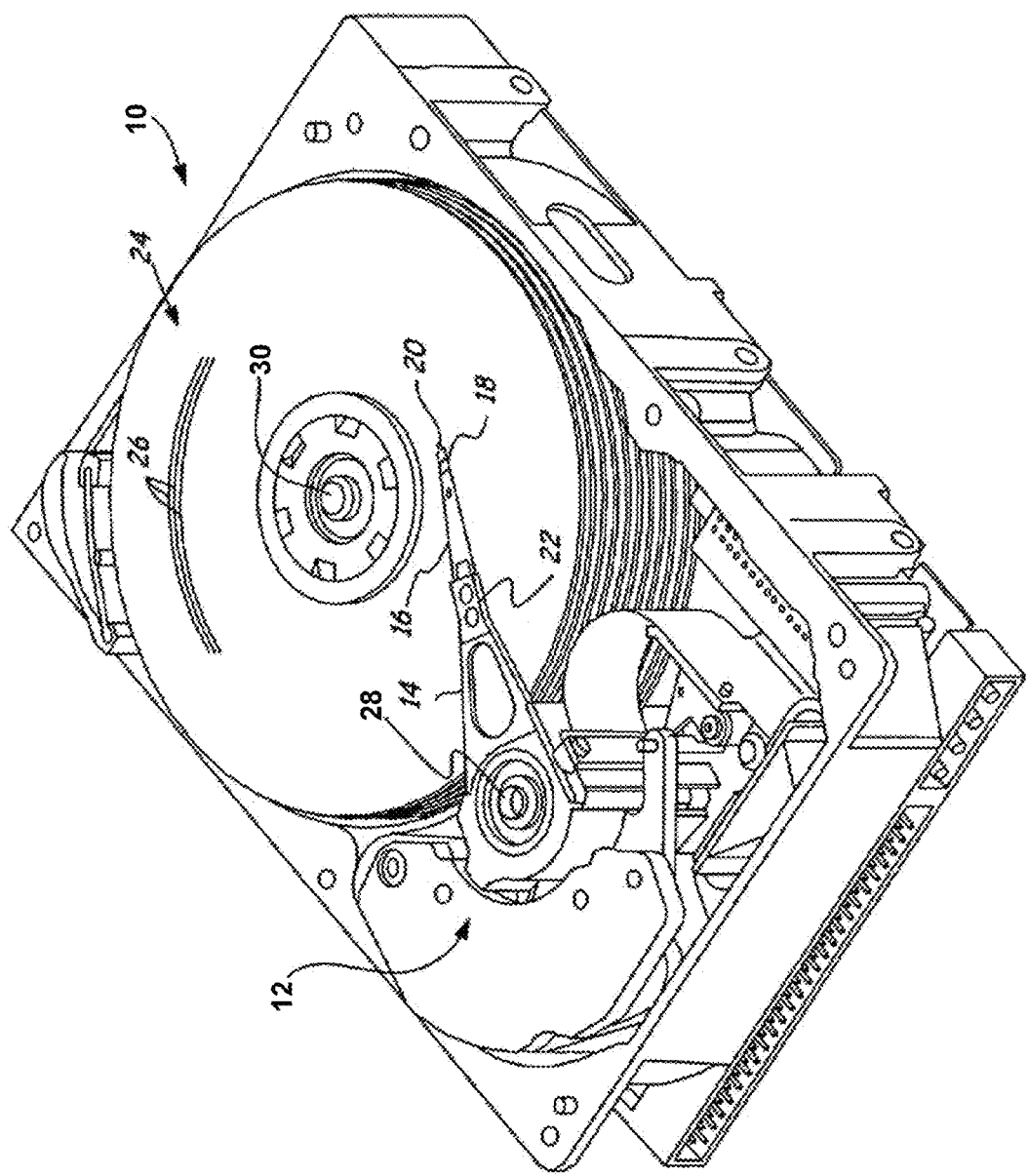
FIG. 1 is a schematic diagram of an example disc drive that may include a slider attached by an attachment pad.

The following detailed description is to be read with reference to the drawings, in which like elements in different drawings have like reference numbers. The drawings, which are not necessarily to scale, are provided for illustrative purposes only and are not intended to limit the scope of the disclosure. Rather, the disclosure is intended to cover alternatives, modifications, and equivalents as may be included within the scope of the claims.

A slider for a disc drive assembly may be attached to different surfaces during manufacture of the slider as well as upon installation into the disc drive assembly. For example, during manufacture of the slider, the slider may be attached to a carrier assembly that carriers multiple sliders through different clean room manufacturing processes. A backside of the slider (or a substrate that will be manufactured into the slider) may be attached to the carrier assembly. As the carrier assembly travels through the manufacturing process, different processing steps may be performed on the front side of the slider opposite the carrier assembly so as to fabricate the slider. Once processing is complete, the slider may be detached from the carrier assembly and subsequently reattached to a suspension assembly that forms part of the disc drive assembly, thereby placing the slider in service.

To attach a slider to a carrier surface, such as a surface of a carrier assembly or a surface of a suspension assembly, attachment pads may be provided on both the slider and the carrier surface. The attachment pads may include a solder-wettable material that easily wets upon application of molten solder. During attachment, molten solder can be deposited between the attachment pad of the slider and attachment pad of the carrier surface, wetting the solder-wettable material and establishing a bond between the slider and carrier surface.

When manufacturing large numbers of sliders, manufacturing defects in individual sliders may occasionally be detected during manufacture and/or upon testing the slider in a disc drive assembly. When this occurs, the slider may be removed from a carrier surface and sent back to correct the manufacturing defect. For example, when a defect is detected in a slider, a solder bond between the slider and a carrier surface may be heated to a temperature above the melting temperature of the solder. The solder bond, including the solder-wettable material on the attachment pads, may liquefy, releasing the slider from the carrier surface. To subsequently reattach the slider to a different carrier surface, for example, to correct the manufacturing defect or to reinstall a fixed slider back on a suspension arm, the slider may not simply be soldered to the different carrier surface. Rather, because the solder-wettable material on the slider attachment pad was wetted during formation of the initial solder bond and liquefied to break the bond, the slider may not have a solder-wettable surface to form a new solder bond between the slider and different carrier surface. The absence of a reusable attachment pad may require that the slider be fully reworked by depositing a new attachment pad on the slider in order to reattach the slider to a carrier surface.

This disclosure describes an attachment pad that, in some examples, includes multiple layers of solder-wettable material in a vertically stacked arrangement. Each layer of solder-wettable material may be separated by a diffusion barrier layer that functions as a barrier between the different layers of solder-wettable material. Further, each layer of solder-wettable material may be formed of a material that is inert to a chemical etchant that can chemically dissolve the diffusion barrier layers. In use, solder may be deposited on an outermost layer of solder-wettable material, wetting the material and forming a bond between the attachment pad and a separate attachment surface. The diffusion barrier layer under the outermost layer of solder-wettable material may limit diffusion of solder applied to the outermost layer of solder-wettable material to underlying layers in the vertically stacked arrangement. In instances in which the attachment pad needs to be separated from the attachment surface, the bond may be heated to a temperature above the melting temperature of the solder, liquefying the solder and breaking the bond. After separation, the attachment pad may define an outermost surface of residual solder and the diffusion barrier layer that was previously under the outermost layer of solder-wettable material. To restore the attachment pad, chemical etchant can be applied to the attachment pad so as to dissolve the diffusion barrier layer and expose a fresh layer of solder-wettable material underlying the diffusion barrier layer. In this manner, the attachment pad may be restored to create another solder bond between the attachment pad and an attachment surface.

In one example, a slider attachment system is described that includes a substrate, a first diffusion barrier layer formed over at least a portion of the substrate and a first solder-wettable protection layer formed over the first diffusion barrier layer. The slider attachment system further includes a second diffusion barrier layer formed over the first solder-wettable protection layer and a second solder-wettable protection layer formed over the second diffusion barrier layer. Depending on the configuration of the attachment system, the first solder-wettable protection layer may encase the first diffusion barrier layer and the second solder-wettable protection layer may encase the second diffusion barrier layer. For example, the first solder-wettable protection layer may be formed over both the top and sides of the first diffusion barrier layer and the second solder-wettable protection layer may be formed over both the top and sides of the second diffusion barrier layer. During restoration of the attachment pad in which chemical etchant is applied to the attachment pad, the chemical etchant may dissolve an outermost layer of diffusion barrier material while being substantially unreactive toward an underlying solder-wettable protection layer. By configuring the solder-wettable protection layer to encase one or more layers of diffusion barrier material lower in the layer stack, the solder-wettable protection layer may prevent chemical etchant from dissolving the one or more layers of diffusion barrier material lower in the layer stack when only wishing to dissolve the outermost layer of diffusion barrier material.

Example techniques for restoring an attachment pad are described in greater detail with reference to FIGS. 6A-6F. Further, example attachment pad configurations are described in greater detail with reference to FIGS. 4 and 5. However, an example disc drive that may include a slider attached by an attachment pad according to the disclosure will first be described with reference to FIG. 1.

FIG. 1 is a schematic diagram of an example disc drive 10, which may include a slider attached by an attachment pad in accordance with the disclosure. In the example of FIG. 1, disc drive 10 includes a power source 12 (e.g., a voice coil motor), an actuator arm 14, a suspension 16, a flexure 18, a slider 20, a head mounting block 22, and a magnetic disc 24. Actuator arm 14 is connected to a proximal portion of suspension 16 at head mounting block 22. Slider 20 is connected at a distal end of suspension 16 by flexure 18. The different components of disc drive 10 can be housed in a disc enclosure that is defined by a base and a cover (not shown in FIG. 1).

As will be described in greater detail, slider 20 may be connected to flexure 18 by an attachment pad that includes multiple layers of solder-wettable material in a vertically stacked arrangement. Each layer of solder-wettable material may be separated by a diffusion barrier layer that limits diffusion of solder from one solder-wettable layer to another solder-wettable layer lower in the vertically stacked arrangement. In use, a single solder-wettable layer may be used to create a solder bond between the slider 20 and an attachment surface, such as flexure 18. In instances in which slider 20 needs to be detached from the attachment surface and subsequently reattached, e.g., to the same attachment surface or a different attachment surface, the attachment pad can be processed to remove the used solder-wettable layer and to expose an unused solder-wettable layer lower in the vertically stacked arrangement.

With further reference to the example of disc drive 10 in FIG. 1, actuator arm 14 is coupled to power source 12, which may be a voice coil motor (VCM). During operation, power source 12 can selectively move actuator arm 14 around axis 28. Movement of actuator arm 14 in turn causes suspension 16 to rotate radially with respect to magnetic disc 24. Through this radial movement, the read/write electromagnetic transducer carried by slider 20 can be selectively positioned above a target recording track 26 on magnetic disc 24, e.g., between an innermost recording track and an outermost recording track.

In some examples, disc drive 10 is configured to move actuator arm 14 to a park position when the disc drive is powered down or idling. In these examples, disc drive 10 can include a ramp positioned adjacent an outer circumferential edge of magnetic disc 24. When disc drive 10 is stopped or idling, power source 12 rotates actuator arm 14 to a park position, e.g., such that actuator arm 14 contacts a portion of the ramp. This may unload the read/write electromagnetic transducer carried by slider 20 from magnetic disc 24. For instance, in one example when actuator arm 14 is moved to a park position, slider 20 is not located above magnetic disc 24 but rather is positioned to the side of the magnetic disc (e.g., in the X-Y plane indicated on FIG. 1).

In other examples, disc drive 10 is configured for contact start/stop actuation instead of park actuation. In these examples, power source 12 may rotate actuator arm 14 so that slider 20 is positioned on a non-data area of magnetic disc 24 (e.g., instead of entirely off of magnetic disc 24 as in park actuation operation). At power down or during idling, slider 20 contacts magnetic disc 24 as the slider slows down and slides to a halt. Conversely, during power up, slider 20 slides along magnetic disc 24 until a relative velocity between the slider 20 and magnetic disc 24 is sufficient to produce a lift force adequate to cause slider 20 to fly above the surface of the disc.

Disc drive 10 is configured to store information representative of data. For this reason, disc drive 10 may include at least one magnetic disc 24 which, in the example of FIG. 1, is illustrated as a plurality of magnetic discs. Magnetic disc 24 is attached to spindle hub 30, which rotates the magnetic disc during operation. Magnetic disc 24 may store information as magnetically oriented discrete domains on a magnetic film. For example, each discrete domain on the magnetic film may represent a bit of data, with one magnetic orientation representing a "0" and a substantially opposite magnetic orientation representing a "1."

In different examples, disc drive 10 may include a single magnetic disc 24 or a plurality of magnetic discs (e.g., two, three, four, or more) attached to spindle hub 30, and it should be appreciated that the disclosure is not limited in this respect. In examples in which disc drive 10 includes a plurality of magnetic discs, the disc drive may also include a plurality of sliders carrying a plurality of read/write electromagnetic transducers, where a different one of the plurality of transducers is configured to read and/or write data to a different one of the plurality of magnetic discs. The plurality of sliders may be connected to a plurality of suspensions, e.g., via a comb-like structure that includes a plurality of actuator arms.

The configuration of disc drive 10 illustrated in FIG. 1 is merely one example of a disc drive that may include a slider with an attachment pad in accordance with the disclosure. Disc drives having different mechanical configurations may be used. For example, a disc drive may have either rotary or linear actuation. Further, different types of disc drives that may be employed include, but are not limited to, hard disc drives, zip drives, and floppy disc drives.

Moreover, while an attachment pad in accordance with the disclosure may be used to attach slider 20 to flexure 18 and suspension 16 in some examples, in other examples, the attachment pad can be used in other applications beyond disc drive 10. For example, as described in greater detail below, the attachment pad may be used during the manufacture of slider 20 (e.g., prior to installation into disc drive 10) to attach the slider to a carrier that carries the slider through manufacturing processes to form the slider. Therefore, it should be appreciated that the disclosure is not limited to the example of an attachment pad used in a disc drive, and other applications are both contemplated and possible.

Figure 2:
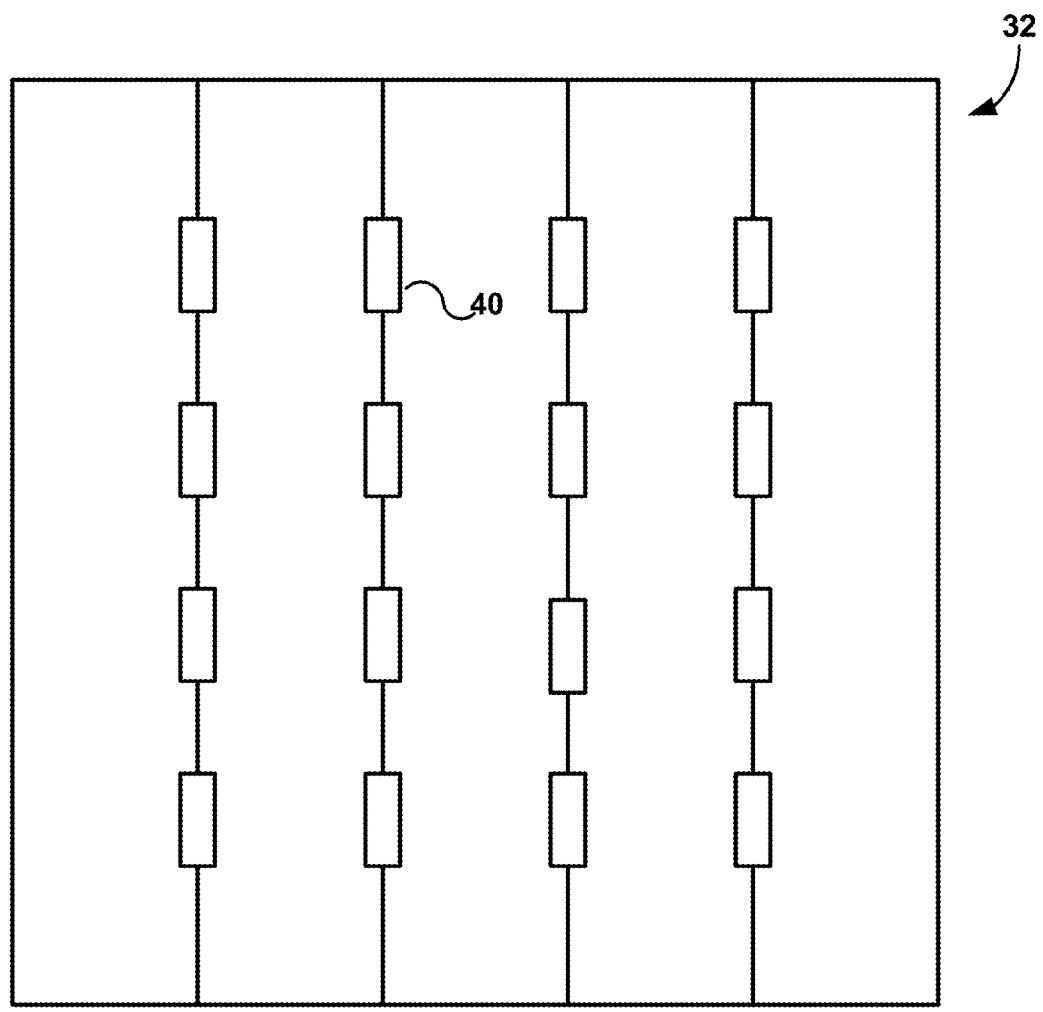
FIG. 2 is a block diagram of an example carrier assembly that may be attached to a slider by an attachment pad.

For example, FIG. 2 is a block diagram illustrating an example carrier assembly 32, which may be used to carry at least one, in some examples a plurality of, sliders 20 (e.g., substrates used to form sliders 20) during manufacture of the sliders. A back surface of sliders 20 may be soldered to attachment surfaces on carrier assembly 32. During subsequent use, different materials may be coated and removed from the front surfaces of sliders 20 until the sliders define a patterned surface for reading information from and/or writing information to a magnetic storage medium. Carrier assembly 32 may be used to carry sliders 20 from one process to another process (e.g., in a clean room environment) during the fabrication of the sliders.

Figure 3:
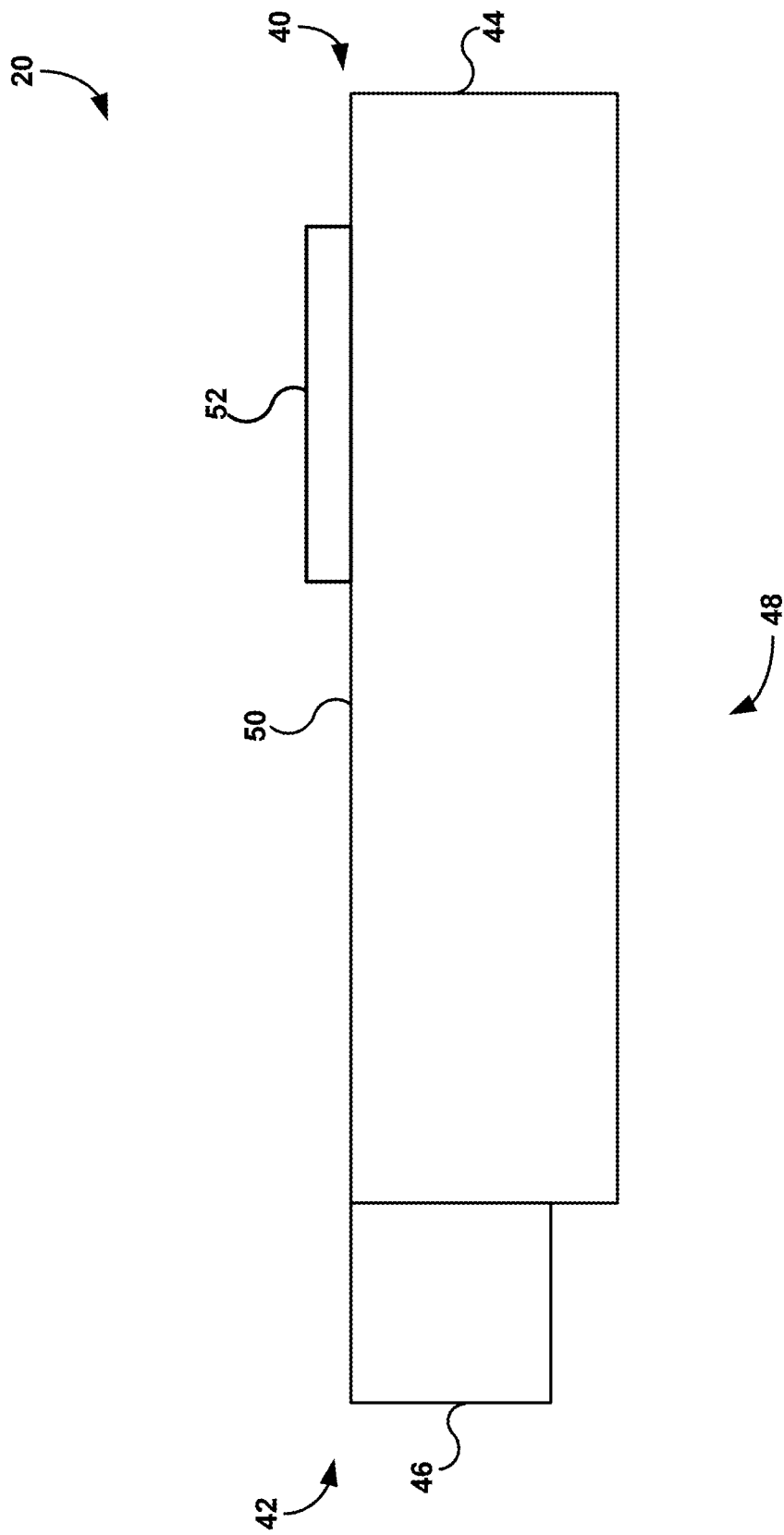
FIG. 3 is a cross-sectional view of an example slider.

FIG. 3 is a cross-sectional view of an example slider 20 that may be attached to an attachment surface using an attachment pad in accordance with the disclosure. In the example of FIG. 3, slider 20 is illustrated as an assembly that includes a slider body 40 and a read/write electromagnetic transducing device 42. Slider 20 defines a leading edge 44 and a trailing edge 46 opposite leading edge 44. Slider 20 also defines an air bearing surface 48 that provides lift to slider 20 during operation and a backside surface 50 that is opposite air bearing surface 48. At least one attachment pad 52 is formed on the backside surface 50 of slider 20, e.g., to attach the slider to a carrier during manufacture of the slider and/or to attach the slider to flexure 18 for installation in disc drive 10. In some examples, slider 20 include multiple attachment pads 52 (e.g., two, three, or more) attachment pads formed along the length of the slider between leading edge 44 and trailing edge 46.

Figure 4:
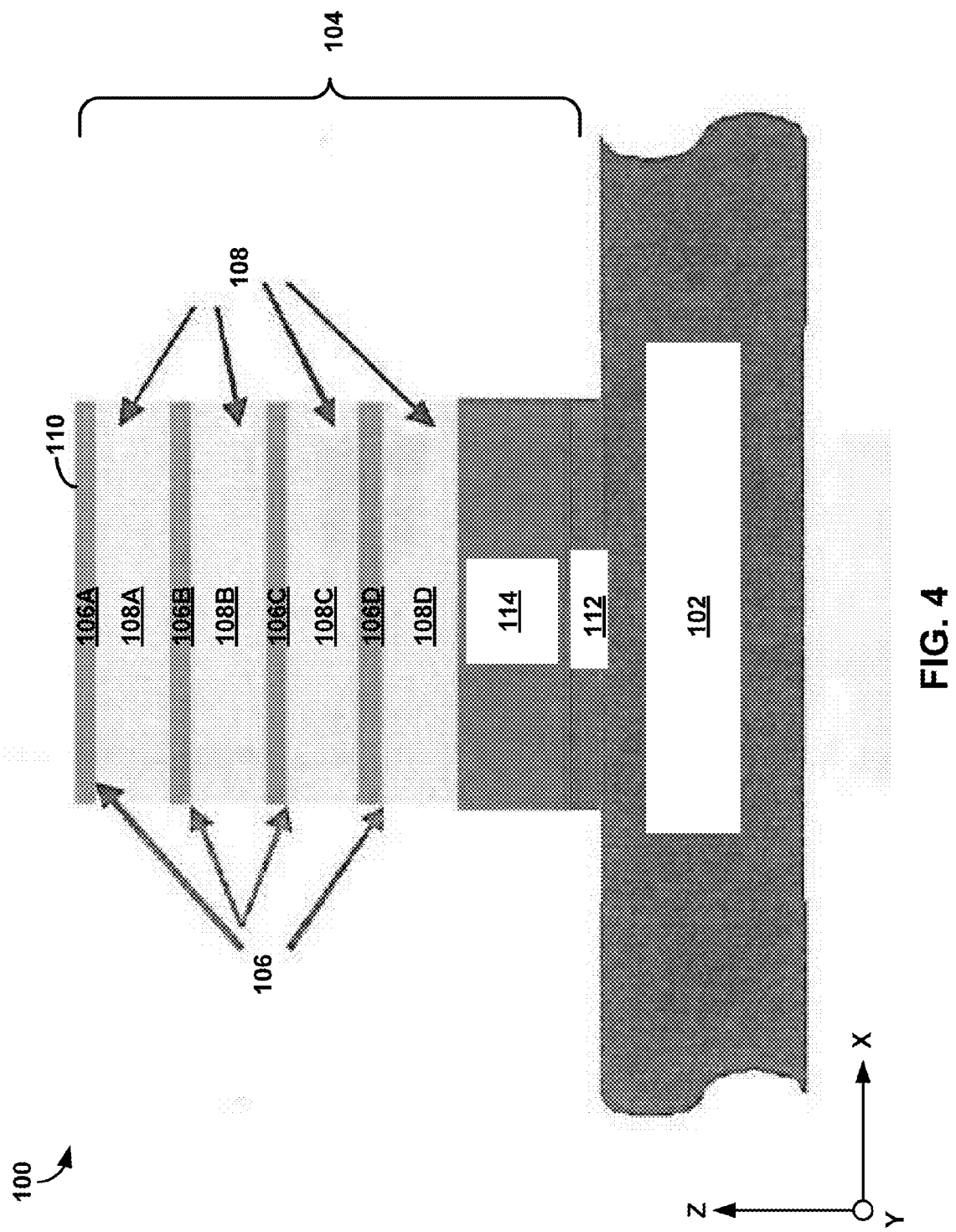
FIG. 4 is a cross-sectional illustration of an example attachment system that may be used to attach a slider to a substrate.

As briefly described above, an attachment pad may be used to form a solder bond between slider 20 and a carrier substrate, such as flexure 18 (FIG. 1) in disc drive 10 or carrier assembly 32 (FIG. 2). FIG. 4 is a block diagram of an example attachment system 100 that may be used to solder slider 20 to a carrier substrate. Attachment system 100 includes a substrate 102 and an attachment pad 104 deposited on the substrate. Attachment pad 104 includes multiple layers of material stacked one on top of another to define the attachment pad. In particular, in the example of FIG. 4, attachment pad 104 includes multiple layers of material stacked one on top of another so that the attachment pad extends in a generally orthogonal direction away from the substrate (e.g., in the Z-direction indicated on FIG. 4).

In general, attachment pad 104 includes at least two solder-wettable protection layers 106 separated by at least one diffusion barrier layer 108 positioned between the at least two solder-wettable protection layers. For example, attachment pad 104 may include a plurality of solder-wettable protection layers 106 separated by a plurality of diffusion barrier layers 108 positioned in alternating arrangement. In different examples, attachment pad 104 may include two, three, four, five, six or more solder-wettable protection layers 106 separated by two, three, four, five, six or more diffusion barrier layers 108. By configuring attachment pad 104 with multiple solder-wettable protection layers, each solder-wettable protection layer can be used to form a different solder bond between the attachment pad (and substrate 102 to which the attachment pad is attached) and an attachment surface (not shown in FIG. 4).

In the example of FIG. 4, attachment pad 104 is defined by four solder-wettable protection layers 106 and four diffusion barrier layers 108, where each solder-wettable protection layer is separated from each other solder-wettable protection layer by at least one diffusion barrier layer. In particular, attachment pad 104 in the example of FIG. 4 includes an outermost solder-wettable protection layer 106A, a first inner solder-wettable protection layer 106B, a second inner solder-wettable protection layer 106C, and an innermost solder-wettable protection layer 106D. The outermost solder-wettable protection layer 106A is separated from the first inner solder-wettable protection layer 106B by an outermost diffusion barrier layer 108A. The first inner solder-wettable protection layer 106B is separated from the second inner solder-wettable protection layer 106C by a first inner diffusion barrier layer 108B. The second solder-wettable protection layer 106C is separated from the innermost solder-wettable protection layer 106D by a second inner diffusion barrier layer 108C. The innermost solder-wettable protection layer 106D is separated from substrate 102 or another layer by innermost diffusion barrier layer 108D.

In use, outermost solder-wettable protection layer 106A may define an exposed surface 110 of attachment pad 104 that can receive molten solder (not shown in FIG. 4) to form a first solder bond between the attachment pad and an attachment surface. As the molten solder is deposited on outermost solder-wettable protection layer 106A, the solder may wet and dissolve the layer. In some examples, the molten solder may also dissolve some but not all of outermost diffusion barrier layer 108A. To subsequently break the solder bond formed between the attachment pad carried by substrate 102 and an attachment surface (e.g., a carrier assembly or flexure), the bond can be heated to a temperature above the melting temperature of the solder. When this occurs, the solder forming the bond may liquefy, breaking the bond between the attachment pad and the attachment surface. In turn, this may leave outermost diffusion barrier layer 108A as the exposed surface 110 of attachment pad, which may or may not also include residual solder from the first solder bond.

To form another solder bond between attachment pad 104 and an attachment surface, the attachment pad may be processed to remove outermost diffusion barrier layer 108A and to expose first inner solder-wettable protection layer 106B. Diffusion barrier layers 108 of attachment pad 104 can be removed using any suitable techniques such as, for example, laser treatment, plasma etching, and chemical etching. In one example, attachment pad 104 is chemically etched with an etching solution that reacts with outermost diffusion barrier layer 108A but which is substantially non-reactive with first inner solder-wettable protection layer 106B. Upon contacting exposed surface 110 of attachment pad 104 to the etching solution, outermost diffusion barrier layer 108A may be removed (e.g., dissolved) by the etching solution while first inner solder-wettable protection layer 106B may be substantially unmodified by the etching solution. In this way, the etching solution may remove the outermost diffusion barrier layer 108A so that first inner solder-wettable protection layer 106B defines exposed surface 110 of attachment pad 104. Thereafter, solder can be applied to first inner solder-wettable protection layer 106B to form a second solder bond between attachment pad 104 and an attachment surface.

Attachment system 100 in the example of FIG. 4 includes substrate 102. Substrate 102 may be any substrate that is desired to be attached to another surface. As examples, substrate 102 may be a slider (e.g., a portion of slider body 40 in FIG. 1), a flexure that connects to a slider (e.g., flexure 18 in FIG. 1), a carrier assembly that connects to a slider (e.g., carrier assembly 32 in FIG. 2), or any other suitable substrate. When substrate 102 is a slider (e.g., slider body 40 in FIG. 1), the slider body can be made of a variety of different materials including, e.g., $Al_2O_3$, TiC, AlTiC, TiC, Si, SiC, $ZrO_2$, or combinations thereof.

Depending on the type of materials used to form substrate 102 and the type of materials used to form attachment pad 104, the attachment pad may include an adhesion layer positioned between substrate 102 and alternating solder-wettable protection layers 106 and diffusion barrier layers 108. In the example of FIG. 4, for instance, attachment pad 104 includes adhesion layer 112 directly deposited on substrate 102. Solder-wettable protection layers 106 and diffusion barrier layers 108 are formed over adhesion layer 112. Adhesion layer 112 may increase adherence between attachment pad 104 and substrate 102 as compared to if the attachment pad was deposited on the substrate without the adhesion layer. In different examples, adhesion layer 112 may include (or, optionally, consist or consist essentially of) titanium, chromium, tantalum, and tungsten. In one example, adhesion layer 112 includes (or, optionally, consist or consist essentially of) titanium.

Attachment pad 104 also includes solder-wettable protection layers 106. Solder-wettable protection layers 106 may be formed of materials that easily wet when contacted with molten solder. For this reason, the layers may be referred to as solder-wettable layers. Moreover, solder-wettable protection layers 106 may be formed of a material that is substantially (e.g., entirely) inert to a chemical etchant that can dissolve diffusion barrier layers 108, e.g., to expose an underlying solder-wettable protection layers. During this process, a solder-wettable protection layer may protect underlying layers (e.g., underlying diffusion barrier layers) from the chemical etchant. For this reason, the layers may also be referred to as protection layers.

A variety of different materials can be used to form solder-wettable protection layers 106. In different examples, solder-wettable protection layers 106 include (or, optionally, consist or consist essentially of) gold, platinum, and/or palladium. In one example, solder-wettable protection layers 106 include (or, optionally, consist or consist essentially of) gold. When attachment pad 104 includes multiple solder-wettable protection layers, each solder-wettable protection layer may be formed of the same material as each other solder-wettable protection layer in the attachment pad, or at least one solder-wettable protection layer may be formed of a material different than at least one other solder-wettable protection layer in the attachment pad.

Solder-wettable protection layers 106 may define any suitable thickness (e.g., in the Z-direction indicated on FIG. 4), and the thickness may vary, e.g., depending on the amount of solder to be placed on a particular solder-wettable protection layer. In some examples, each solder-wettable protection layer of the solder-wettable protection layers 106 defines a thickness less than 2000 angstroms such as, e.g., a thickness less than 1000 angstroms, or a thickness less than 750 angstroms. For example, each solder-wettable protection layer of the solder-wettable protection layers 106 may define a thickness ranging from approximately 50 angstroms to approximately 2000 angstroms such as, e.g., a thickness ranging from approximately 250 angstroms to approximately 1250 angstroms, or a thickness ranging from approximately 500 angstroms to approximately 1000 angstroms. The forgoing thicknesses are merely examples, however, and solder-wettable protection layers having other thicknesses can be used without departing from the scope of the disclosure.

Attachment pad 104 also includes diffusion barrier layers 108. Diffusion barrier layers 108 may function to limit the diffusion of a solder material applied to a solder-wettable protection layer overlying the diffusion barrier layer. For example, a diffusion barrier layer may prevent solder applied to a solder-wettable protection layer above the diffusion barrier layer from diffusing down a solder-wettable protection layer positioned beneath the diffusion barrier layer (e.g., in the negative Z-direction indicated on FIG. 4).

In general, diffusion barrier layers 108 are made from a material that is chemically reactive to an etching chemical to which solder-wettable protection layers 106 are substantially (e.g., completely) chemically inert. In one example, diffusion barrier layers 108 include (or, optionally, consist or consist essentially of) nickel. For example, diffusion barrier layers 108 may be formed of a titanium nickel (TiN) alloy. Other example materials that can be used to form diffusion barrier layers 108 include tungsten and cobalt. When attachment pad 104 includes multiple diffusion barrier layers, each diffusion barrier layer may be formed of the same material as each other diffusion barrier layer in the attachment pad, or at least one diffusion barrier layer may be formed of a material different than at least one other diffusion barrier layer in the attachment pad.

When a diffusion barrier layer includes nickel, the diffusion barrier layer may be dissolved by a chemical etchant that selectively etches nickel but which is substantially non-reactive to solder-wettable protection layers 106. Nickel Etchant Type I commercially available from Transene Company is one type of etchant that may be used to remove a diffusion barrier layer containing nickel without removing an underlying solder-wettable protection layer.

Diffusion barrier layers 108 may define any suitable thickness (e.g., in the Z-direction indicated on FIG. 4), and the thickness may vary, e.g., depending on the amount of diffusion protection needed in attachment pad 104. In some examples, each diffusion barrier layer of the diffusion barrier layers 108 defines a thickness less than 5000 angstroms such as, e.g., a thickness less than 3500 angstroms, or a thickness less than 3000 angstroms. For example, each diffusion barrier layer of the diffusion barrier layers 108 may define a thickness ranging from approximately 500 angstroms to approximately 5000 angstroms such as, e.g., a thickness ranging from approximately 1500 angstroms to approximately 3500 angstroms, or a thickness ranging from approximately 2000 angstroms to approximately 3000 angstroms. In some examples, each diffusion barrier layer of diffusion barrier layers 108 is thicker than each solder-wettable protection layer of solder-wettable protection layers 106.

Attachment pad 104 can include other layers in addition to or in lieu of solder-wettable protection layers 106 and diffusion barrier layers 108. The types of layer(s) that may be included in attachment pad 104 may depend on the intended use of the attachment pad and the substrate on which the attachment pad is deposited. For example, as discussed above, attachment pad 104 may include adhesion layer 112 to increase adherence between substrate 102 and other layers in attachment pad 104. As another example, attachment pad 104 may include a bonding layer positioned between substrate 102 and innermost diffusion barrier layer 106C.

In the example of FIG. 4, attachment pad 104 includes bonding layer 114. Bonding layer 114 is directly deposited on adhesion layer 112, and innermost diffusion barrier layer 106C is directly deposited on bonding layer 114. Bonding layer 114 may help bond adhesion layer 112 to innermost diffusion barrier layer 106C. In some examples, bonding layer 114 is electrically conductive and can transfer electricity through the layer. Although different materials can be used, in some examples, bonding layer 114 includes (or, optionally, consists or consists essentially of) copper. In other examples, attachment pad 104 does not include bonding layer 114, and it should be appreciated that the disclosure is not limited in this respect.

To fabricate attachment pad 104, a bottommost layer of the attachment pad can be directly deposited on substrate 102 and then one layer of the attachment pad can be formed over another layer of the attachment pad until the pad includes a suitable number of solder-wettable protection layers 106 and diffusion barrier layers 108. Any suitable deposition techniques can be used to form the different layers of attachment pad 104 including chemical vapor deposition techniques and physical vapor deposition techniques. In some examples, each layer of attachment pad 104 is deposited using a physical vapor deposition technique such as sputtering (e.g., magnetron sputtering), evaporation, and/or ion beam deposition.

In general, any of the different layers of attachment pad 104 may be formed over one another or directly deposited on one another. As used herein, the phrase "formed over" may mean that one layer is positioned over a previously established layer. The phrase "formed over" may also mean that one or more intervening components, for example, additional layers, may be included between one layer and another layer, although intervening components such as intervening layers are not required. By contrast, the phrase "directly deposited on" may mean that an attachment pad layer is positioned directly adjacent to and in contact with a previously established layer or surface without any additional intervening components or layers.

In addition, although the different layers of attachment pad 104 are generally illustrated and described as being discrete layers with well-defined interfaces between layers, in other examples, some or all of the layers in attachment pad 104 may define graded transitions between layers. For example, a graded transition between a diffusion barrier layer and a solder-wettable protection layer may extend from a region that is 100% diffusion barrier layer material to a region that is 100% solder-wettable protection layer material. Moving from the region of 100% diffusion barrier layer material to the region of 100% solder-wettable protection, the graded transition may define a continuously decreasing concentration of diffusion barrier layer material and a continuously increasing concentration of solder-wettable protection layer material.

In one example, attachment pad 104 is formed by directly depositing adhesion layer 112 on a portion of substrate 102, depositing a first diffusion barrier layer over adhesion layer 112, and then depositing a first solder-wettable protection layer over the first diffusion barrier layer. Thereafter, a second diffusion barrier layer may be deposited over the first solder-wettable protection layer and a second solder-wettable protection layer deposited over the second diffusion barrier layer. In some examples, bonding layer 114 is directly deposited on adhesion layer 112 and the first diffusion barrier layer is directly deposited on the bonding layer. In these examples, the first solder-wettable protection layer may be directly deposited on the first diffusion barrier layer, the second diffusion barrier layer directly deposited on the first solder-wettable protection layer, and the second solder-wettable protection layer directly deposited on the second diffusion barrier layer. In examples in which attachment pad 104 does not include bonding layer 114 and/or adhesion layer 112, the first diffusion barrier layer may be directly deposited on adhesion layer 112 and/or substrate 102 rather than an intervening layer. Further, if desired, additional diffusion barrier layers and solder-wettable protection layers can be deposited in alternating sequence over the second solder-wettable protection layer in the examples described above.

In forming the different layers of attachment pad 104, each solder-wettable protection layer may be deposited over an underlying diffusion barrier layer so that the solder-wettable protection layer extends over a top surface of the underlying diffusion barrier layer (e.g., a surface in the X-Y plane indicated on FIG. 4) but not sides of the underlying diffusion barrier layer (e.g., surfaces in the X-Z and Y-Z planes indicated on FIG. 4). Alternatively, each solder-wettable protection layer may be deposited over an underlying diffusion barrier layer so that the solder-wettable protection layer extends over a top surface and side surfaces of the underlying diffusion barrier layer. Likewise, each diffusion barrier layer may be deposited over an underlying solder-wettable protection layer so that the diffusion barrier layer extends over a top surface of the underlying solder-wettable protection layer but not sides of the underlying solder-wettable protection layer. Alternatively, each diffusion barrier layer may be deposited over an underlying solder-wettable protection layer so that the diffusion barrier layer extends over a top surface and side surfaces of the underlying solder-wettable protection layer.

Figure 5:
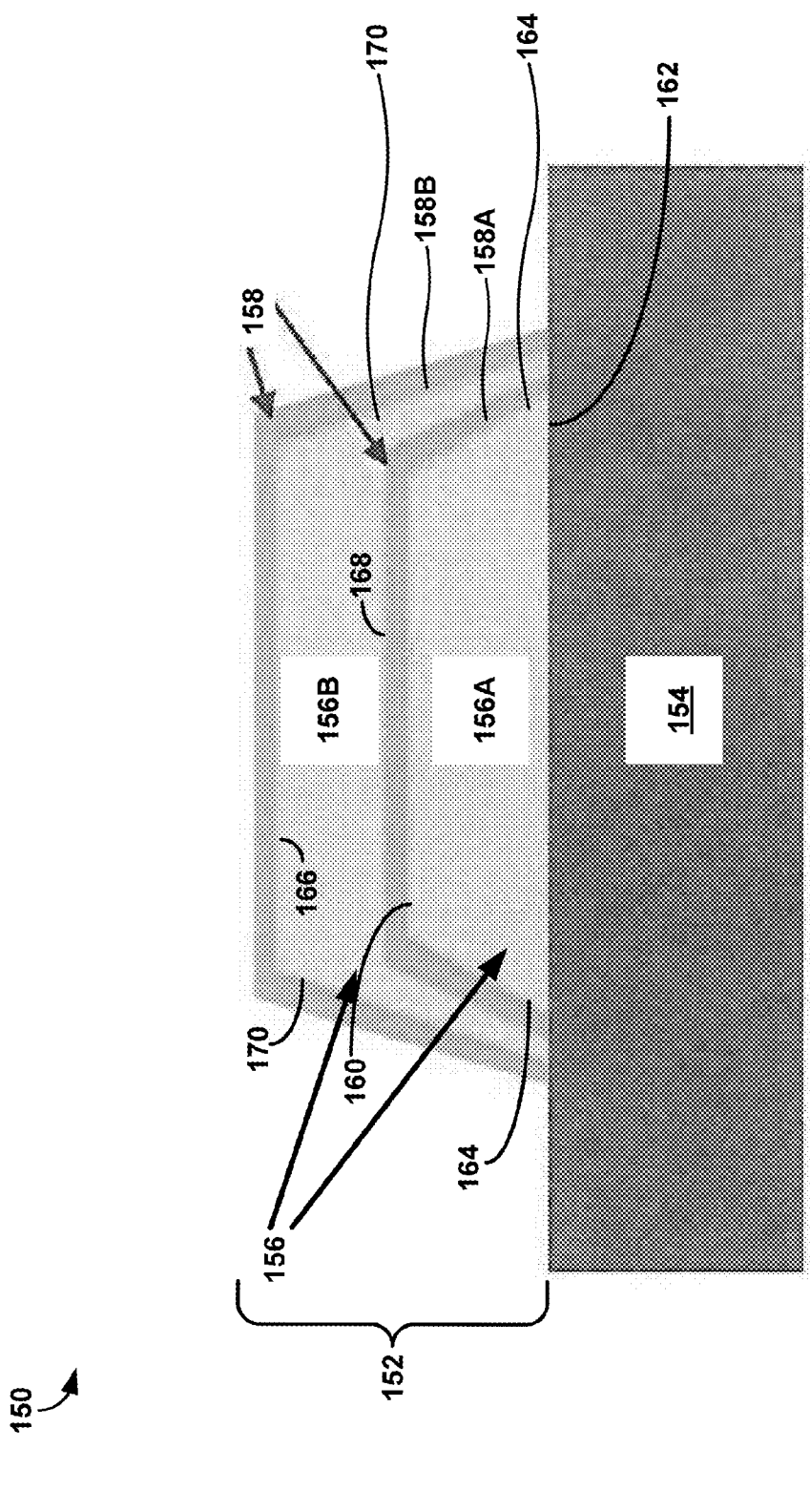
FIG. 5 is a cross-sectional illustration of another example attachment system that may be used to attach a slider to a substrate.

FIG. 5 is a cross-sectional illustration of an example attachment system 150, which includes an attachment pad 152 deposited on a substrate 154. In this example, attachment pad 152 includes a first diffusion barrier layer 156A, a first solder-wettable protection layer 158A, a second diffusion barrier layer 156B, and a second solder-wettable protection layer 158B. Second solder-wettable protection layer 158B is directly deposited on second diffusion barrier layer 156B, and second diffusion barrier layer 156B is directly deposited on first solder-wettable protection layer 158A. In turn, first solder-wettable protection layer 158A is directly deposited on first diffusion barrier layer 156A, and first diffusion barrier layer 156A is directly deposited on substrate 154. In other examples, attachment pad 152 may further include an adhesion layer, a bonding layer, or any other suitable functional layers. In addition, although attachment pad 152 in the example of FIG. 5 includes two solder-wettable protection layers and two diffusion barrier layers, in other examples, the attachment pad may include fewer layers (e.g., two-solder-wettable protection layers and one diffusion barrier layer) or more layers (e.g., three, four, or more solder-wettable protection layers and three, four, or more diffusion barrier layers).

In the example of FIG. 5, attachment pad 152 is configured so that each solder-wettable protection layer encases each underlying diffusion barrier layer in the attachment pad between the solder-wettable protection layer and substrate 154. For example, second solder-wettable protection layer 158B in attachment pad 152 encases second diffusion barrier layer 156B between second solder-wettable protection layer 158B and substrate 154. Further, first solder-wettable protection layer 158A in attachment pad 152 encases first diffusion barrier layer 156A between first solder-wettable protection layer 158A and substrate 154. A solder-wettable protection layer may encase an underlying diffusion barrier layer by extending over all outwardly-facing surfaces of the underlying diffusion barrier layer (e.g., top surfaces and side surfaces of the layer) and all other layers positioned beneath that underlying diffusion barrier layer.

Configuring each solder-wettable protection layer so that each layer encases an underlying diffusion barrier layer may be useful to protect the underlying diffusion barrier layer from attack during restoration of attachment pad 152. For example, as described above, an outermost solder-wettable protection layer (e.g., second solder-wettable protection layer 158B) may be wetted with solder to form a first solder bond. If the first solder bond needs to be broken and another solder bond formed on an underlying solder-wettable protection layer (e.g., first solder-wettable protection layer 158A), the diffusion barrier layer covering the underlying solder-wettable protection layer (e.g., second diffusion barrier layer 156B) may need to be first removed. To remove the diffusion barrier layer, the layer may be exposed to a chemical etching solution that can dissolve the diffusion barrier layer but that is substantially inert to the underlying solder-wettable protection layer. If the underlying solder-wettable protection layer does not fully protect other diffusion barrier layers underlying the solder-wettable protection layer (e.g., first diffusion barrier layer 156A), the chemical etching solution may dissolve both the outermost diffusion barrier layer (e.g., second diffusion barrier layer 156B) and underlying diffusion barrier layers (e.g., first diffusion barrier layer 156A). For these and other reasons, each solder-wettable protection layer in attachment pad 152 may encase each diffusion barrier layer underlying the solder-wettable protection layer.

In some examples, attachment pad 152 is also configured so that each diffusion barrier layer in the attachment pad encases each underlying solder-wettable protection layer in the attachment pad between the diffusion barrier layer and substrate 154. For example, second diffusion barrier layer 156B in attachment pad 152 encases first solder-wettable protection layer 158A between second diffusion barrier layer 156B and substrate 154. A diffusion barrier layer may encase an underlying solder-wettable protection layer by extending over all outwardly-facing surfaces of the underlying solder-wettable protection layer (e.g., top surfaces and side surfaces of the layer) and all other layers positioned beneath that underlying solder-wettable protection layer. Configuring each diffusion barrier layer so that each layer encases an underlying solder-wettable protection layer may be useful to protect the underlying solder-wettable protection layer from diffusion of solder. For example, if a diffusion barrier layer (e.g., second diffusion barrier layer 156B) does not fully protect other solder-wettable protection layers (e.g., first solder-wettable protection layer 158A) underlying the diffusion barrier layer, the underlying solder-wettable protection layers may solder wet when solder is applied to an outermost solder-wettable protection layer (second solder-wettable protection layer 158B). For these and other reasons, each diffusion barrier layer in attachment pad 152 may encase each solder-wettable protection layer underlying the diffusion barrier layer.

In the example of FIG. 5, first diffusion barrier layer 156A defines a top surface 160, a bottom surface 162 opposite the top surface, and side surfaces 164 connecting the top surface to the bottom surface. In this example, first solder-wettable protection layer 158A is directly deposited on top surface 160 and side surfaces 164 of first diffusion barrier layer 156A. When so configured, first solder-wettable protection layer 158A may encase first diffusion barrier layer 156A, e.g., so as to prevent chemical etchant from attacking outwardly facing surfaces of first diffusion barrier layer 156A when dissolving second diffusion barrier layer 156B.

In addition, second diffusion barrier layer 156B in the example of FIG. 2 defines a top surface 166, a bottom surface 168 opposite the top surface, and side surfaces 170 connecting the top surface to the bottom surface. Second solder-wettable protection layer 158B in this example is directly deposited on top surface 166 and side surfaces 170 of second diffusion barrier layer 156B, which may encase the second diffusion barrier layer.

Figures 6A, 6B, 6C:
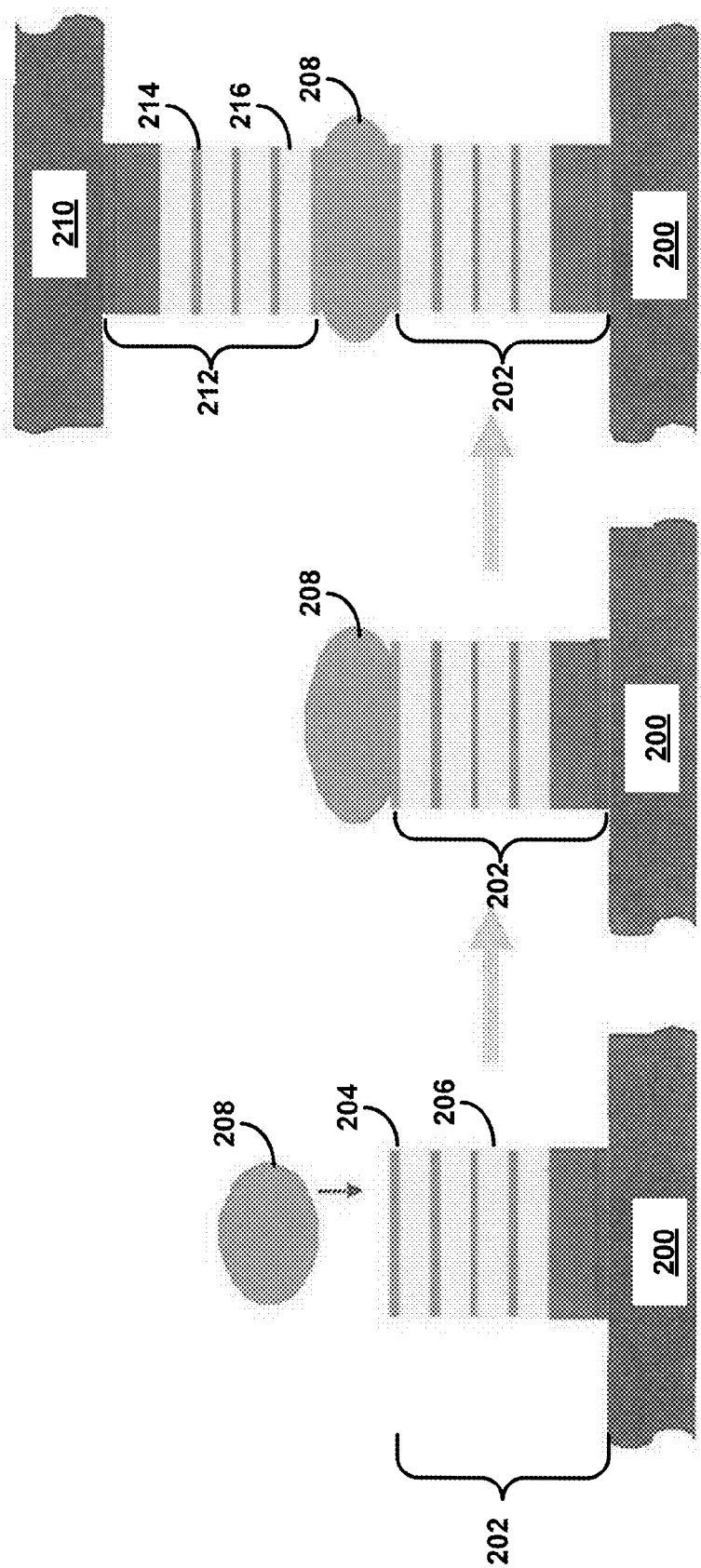

FIGS. 6A-6F are conceptual illustrations of example processing steps that may be performed to solder attach a slider to an attachment surface and then restore an attachment pad to allow for a subsequent solder connection. As shown in FIGS. 6A and 6B, a substrate 200 may carry an attachment pad 202 that includes a plurality of solder-wettable protection layers 204 alternatingly stacked with a plurality of diffusion barrier layers 206. In different examples, substrate 200 may be a portion of a slider (e.g., slider body 40 in FIG. 3) or a portion of an attachment surface to which a slider is to be connected (e.g., flexure 18 in FIG. 1). In either case, molten solder 208 may be deposited on an outermost solder-wettable protection layer of solder-wettable protection layers 204, wetting the layer to form a solder connection between substrate 200 and another attachment surface.

As shown in FIG. 6C, attachment pad 202 with molten solder 208 may be pressed in contact with an attachment surface 210 to form a solder bond between substrate 200 and attachment surface 210. After cooling below the melting temperature of molten solder 208, the solder bond may solidify to fixedly connect substrate 200 to attachment surface 210. Attachment surface 210 may be any surface to which substrate 200 is attached including, for example, a portion of a slider (e.g., slider body 40 in FIG. 3) or a portion of an attachment surface to which a slider is to be connected (e.g., flexure 18 in FIG. 1). In one example, attachment surface 210 is a portion of slider body 40 (FIG. 3) and substrate 200 is a portion of carrier assembly 32 (FIG. 2).

Attachment surface 210 may or may not include an attachment pad that defines a wettable surface for contacting molten solder 208. In the example of FIGS. 6C and 6D, attachment surface 210 carries an attachment pad 212 that includes a plurality of solder-wettable protection layers 214 and a plurality of diffusion barrier layers 216. In other examples, attachment surface 210 may carry an attachment pad that includes only a single solder-wettable protection layer such as a single solder-wettable protection layer positioned over a single diffusion barrier layer.

For various reasons, the solder bond between substrate 200 and attachment surface 210 may need to be broken to separate substrate 200 from attachment surface 210. As shown in FIG. 6D, the solder bond between substrate 200 and attachment surface 210 may be broken by heating the bond to a temperature above the melting temperature of the solder used to form the bond. Once separated, a diffusion barrier layer of attachment pad 202 may define an outermost surface 218 of the attachment pad. Outermost surface 218 may or may not also include solder residue.

To restore attachment pad 202 to receive another solder connection, the outermost surface 218 of the attachment pad may be contacted with an etching chemical. For example, as illustrated in the example of FIG. 6E, the outermost surface 218 of the attachment pad may be contacted with an etching chemical that dissolves the diffusion barrier layer defining outermost surface 218 but which is substantially inert to a solder-wettable protection layer underlying the diffusion barrier layer. By removing the diffusion barrier layer defining outermost surface 218 of attachment pad 202, a solder-wettable protection layer may be exposed to an external environment, as shown in FIG. 6F. In this manner, attachment pad 202 may be restored to provide another solder-wettable protection layer for forming another solder connection to the attachment pad.

Various examples have been described. These and other examples are within the scope of the following claims.

The invention claimed is:

1. A slider attachment system comprising:
a substrate;
a first diffusion barrier layer formed over a portion of the substrate;
a first solder-wettable protection layer formed over the first diffusion barrier layer;
a second diffusion barrier layer formed over the first solder-wettable protection layer; and
a second solder-wettable protection layer formed over the second diffusion barrier layer.

2. The slider attachment system of claim 1, wherein the first solder-wettable protection layer is formed over the first diffusion barrier layer so as to encase the first diffusion barrier layer between the first solder-wettable protection layer and the substrate, and the second solder-wettable protection layer is formed over the second diffusion barrier layer so as to encase the second diffusion barrier layer between the second solder-wettable protection layer and the substrate.

3. The slider attachment system of claim 1, wherein the first diffusion barrier layer is formed of a same material as the second diffusion barrier layer, and the first solder-wettable protection layer is formed of a same material as the second solder-wettable protection layer.

4. The slider attachment system of claim 1, wherein the first diffusion barrier layer and the second diffusion barrier layer include at least one of nickel, cobalt, and tungsten, and the first solder-wettable protection layer and the second solder-wettable protection layer include at least one of gold, platinum, and palladium.

5. The slider attachment system of claim 4, wherein the first diffusion barrier layer and the second diffusion barrier layer include nickel, and the first solder-wettable protection layer and the second solder-wettable protection layer include gold.

6. The slider attachment system of claim 1, further comprising an adhesion layer formed over the portion of the substrate, wherein the first diffusion barrier layer is formed over the adhesion layer.

7. The slider attachment system of claim 6, wherein the adhesion layer includes at least one of titanium, chromium, tantalum, and tungsten.

8. The slider attachment system of claim 1, wherein the substrate is a slider body.

9. The slider attachment system of claim 1, wherein the substrate is a portion of a suspension assembly of a disc drive.

10. The slider attachment system of claim 1, further comprising an adhesion layer formed directly over a portion of the substrate, wherein the first diffusion barrier layer is formed directly over the adhesion layer, the first solder-wettable protection layer is formed directly over the first diffusion barrier layer so as to encase the first diffusion barrier layer between the first solder-wettable protection layer and the substrate, the second diffusion barrier layer is formed directly over the first solder-wettable protection layer so as to encase the first solder-wettable protection layer between the second diffusion barrier layer and the substrate, and the second solder-wettable protection layer is formed directly over the second diffusion barrier layer so as to encase the second diffusion barrier layer between the second solder-wettable protection layer and the substrate.

11. The slider attachment system of claim 1, further comprising an adhesion layer formed over a portion of the substrate, wherein
the first diffusion barrier layer is formed over the adhesion layer, the first diffusion barrier layer defining a top surface, a bottom surface opposite the top surface, and side surfaces connecting the top surface and the bottom surface, the bottom surface being positioned closer to the adhesion layer than the top surface,
the first solder-wettable protection layer is formed over the top surface and the side surfaces of the first diffusion barrier layer,
the second diffusion barrier layer is formed over the first solder-wettable protection layer, the second diffusion barrier layer defining a top surface, a bottom surface opposite the top surface, and side surfaces connecting the top surface and the bottom surface, the bottom surface of the second diffusion barrier layer being positioned closer to the first solder-wettable layer than the top surface, and
the second solder-wettable protection layer formed over the top surface and the side surfaces of the second diffusion barrier layer.

12. The slider attachment system of claim 11, wherein the first diffusion barrier layer and the second diffusion barrier layer include nickel, and the first solder-wettable protection layer and the second solder-wettable protection layer include gold.

13. A method for slider attachment comprising:
forming a first diffusion barrier layer over a portion of a substrate;
forming a first solder-wettable protection layer over the first diffusion barrier layer;
forming a second diffusion barrier layer over the first solder-wettable protection layer; and
forming a second solder-wettable protection layer over the second diffusion barrier layer.

14. The method for slider attachment of claim 13, wherein forming the first solder-wettable protection layer comprises forming the first solder-wettable protection layer over the first diffusion barrier layer so as to encase the first diffusion barrier layer between the first solder-wettable protection layer and the substrate, and forming the second solder-wettable protection layer comprises forming the second solder-wettable protection layer over the second diffusion barrier layer so as to encase the second diffusion barrier layer between the second solder-wettable protection layer and the substrate.

15. The method for slider attachment of claim 13, wherein the first diffusion barrier layer and the second diffusion barrier layer include at least one of nickel, cobalt, and tungsten, and the first solder-wettable protection layer and the second solder-wettable protection layer include at least one of gold, platinum, and palladium.

16. The method for slider attachment of claim 15, wherein the first diffusion barrier layer and the second diffusion barrier layer include nickel, and the first solder-wettable protection layer and the second solder-wettable protection layer include gold.

17. The method for slider attachment of claim 13, further comprising forming an adhesion layer over the portion of the substrate, the adhesion layer including at least one of titanium, chromium, tantalum, and tungsten, wherein forming the first diffusion barrier layer over the portion of the substrate comprises forming the first diffusion barrier layer over the adhesion layer.

18. The method for slider attachment of claim 13, further comprising forming an adhesion layer over at least a portion of the substrate, wherein forming the first diffusion barrier layer comprises forming the first diffusion barrier layer directly over the adhesion layer, the first diffusion barrier layer defining a top surface, a bottom surface opposite the top surface, and side surfaces connecting the top surface and the bottom surface, the bottom surface being positioned closer to the adhesion layer than the top surface, forming the first solder-wettable protection layer comprises forming the first solder-wettable protection layer directly over the top surface and the side surfaces of the first barrier diffusion layer, forming the second diffusion barrier layer comprises forming the second diffusion barrier layer directly over the first solder-wettable protection layer, the second diffusion barrier layer defining a top surface, a bottom surface opposite the top surface, and side surfaces connecting the top surface and the bottom surface, the bottom surface of the second diffusion barrier layer being positioned closer to the first solder-wettable layer than the top surface, and forming the second solder-wettable protection layer comprises forming the second solder-wettable protection layer directly over the top surface and the side surfaces of the second diffusion barrier layer.

19. A method for slider attachment comprising:

depositing solder on an outer solder-wettable protection layer of an attachment pad formed on a substrate so as to dissolve the outer solder-wettable protection layer, wherein the attachment pad comprises an inner diffusion barrier layer formed over a portion of the substrate, an inner solder-wettable protection layer formed over the inner diffusion barrier layer, an outer diffusion barrier layer formed over the inner solder-wettable protection layer, and the outer solder-wettable protection layer formed over the outer diffusion barrier layer; and applying a chemical etchant to the attachment pad so as to remove the outer diffusion barrier layer and expose the inner solder-wettable protection layer to an external environment, the chemical etchant being configured to chemically dissolve the outer diffusion barrier layer but being substantially non-reactive with the inner solder-wettable protection layer.

20. The method for slider attachment of claim 19, wherein depositing solder on the outer solder-wettable protection layer comprises depositing a first portion of solder on the outer solder-wettable substrate and further comprising, subsequent to apply the chemical etchant, depositing a second portion of solder on the inner solder-wettable protection layer so as to dissolve the inner solder-wettable protection layer.

* * * * *